United States Patent
Chai et al.

(10) Patent No.: US 10,678,577 B2
(45) Date of Patent: Jun. 9, 2020

(54) METHOD FOR IMPLEMENTING VIRTUAL SECURE ELEMENT

(71) Applicant: CHINA UNIONPAY CO., LTD., Shanghai (CN)

(72) Inventors: Hongfeng Chai, Shanghai (CN); Zhijun Lu, Shanghai (CN); Shuo He, Shanghai (CN); Wei Guo, Shanghai (CN); Yu Zhou, Shanghai (CN); Dingzhou Li, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 135 days.

(21) Appl. No.: 14/781,644

(22) PCT Filed: Apr. 11, 2014

(86) PCT No.: PCT/CN2014/075163
§ 371 (c)(1),
(2) Date: Oct. 1, 2015

(87) PCT Pub. No.: WO2014/166418
PCT Pub. Date: Oct. 16, 2014

(65) Prior Publication Data
US 2016/0062784 A1  Mar. 3, 2016

Related U.S. Application Data

(60) Provisional application No. PCT/CN2014/075163, filed on Apr. 11, 2014.

(30) Foreign Application Priority Data

Apr. 12, 2013  (CN) .......................... 2013 1 0123082

(51) Int. Cl.
*G06F 9/455* (2018.01)
*G06F 21/57* (2013.01)
(Continued)

(52) U.S. Cl.
CPC .......... *G06F 9/45558* (2013.01); *G06F 21/53* (2013.01); *G06F 21/57* (2013.01);
(Continued)

(58) Field of Classification Search
CPC ...... G06F 9/45558; G06F 21/57; G06F 21/53; G06F 2009/45583; G06F 2009/45587;
(Continued)

(56) References Cited

U.S. PATENT DOCUMENTS 9,246,690 B1 * 1/2016 Roth ..................... H04L 9/3268
2006/0174352 A1 * 8/2006 Thibadeau ........... G06Q 20/341
726/27

(Continued)

FOREIGN PATENT DOCUMENTS

CN  101101575 A  1/2008
CN  101414913 A  4/2009
(Continued)

OTHER PUBLICATIONS

Unknown Author, "Understanding Digital Certificates", technet.microsoft.com/en-us/library/bb123848(v=exchg.65).aspx, May 2005.*

(Continued)

*Primary Examiner* — Wynuel S Aquino
*Assistant Examiner* — Kevin X Lu
(74) *Attorney, Agent, or Firm* — Anova Law Group, PLLC

(57) ABSTRACT

The invention discloses a method for realizing virtual secure element (VSE), which comprises the following steps: a secure element manager (SEM) generates a request which comprises virtualized configuration information; and a virtual machine monitor in a hypervisor allocates an address space for the VSE according to the above request.

3 Claims, 1 Drawing Sheet

(51) Int. Cl.
    *G06F 21/53*     (2013.01)
    *H04W 12/08*     (2009.01)
    *H04W 12/04*     (2009.01)
    *H04W 12/10*     (2009.01)
    *H04W 12/00*     (2009.01)

(52) U.S. Cl.
    CPC ....... *H04W 12/04* (2013.01); *H04W 12/0806* (2019.01); *G06F 2009/45583* (2013.01); *G06F 2009/45587* (2013.01); *H04W 12/00405* (2019.01); *H04W 12/10* (2013.01)

(58) Field of Classification Search
    CPC . H04W 12/0806; H04W 12/04; H04W 12/10; H04W 12/00405
    See application file for complete search history.

(56) References Cited

U.S. PATENT DOCUMENTS

| | | |
|---|---|---|
| 2006/0256106 A1 | 11/2006 | Scarlata et al. |
| 2010/0153721 A1 | 6/2010 | Mellqvist |
| 2010/0332635 A1 | 12/2010 | Rogel et al. |
| 2013/0023235 A1 | 1/2013 | Fan et al. |
| 2013/0340028 A1* | 12/2013 | Rajagopal ............... H04L 63/08 726/1 |
| 2013/0347064 A1* | 12/2013 | Aissi ....................... G06F 21/30 726/2 |
| 2014/0342715 A1 | 11/2014 | Gu et al. |

FOREIGN PATENT DOCUMENTS

| | | | |
|---|---|---|---|
| CN | 101436966 A | | 5/2009 |
| CN | 101645873 A | | 2/2010 |
| CN | 101853416 A | * | 10/2010 |
| CN | 102246465 A | | 11/2011 |
| CN | 102257507 A | | 11/2011 |
| CN | 102567752 A | | 7/2012 |

OTHER PUBLICATIONS

Unknown Author, Smart Card Alliance, Module 1—Smart Card Fundamentals, www.securetechalliance.org/wp-content/uploads/CSCIP_Module_1_Smart_Card_Fundamentals_V3_1008101.pdf, Oct. 8, 2010 (Year: 2010).*

Hurwitz et. al., "How to Use Virtualization with Cloud Computing", www.dummies.com/programming/networking/how-to-use-virtualization-with-cloud-computing/, Oct. 2009 (Year: 2009).*

Karger et al—Processor Requirements for a High Security Smart Card Operating System, RC24219, Mar. 20, 2007 (Year: 2007).*

* cited by examiner

METHOD FOR IMPLEMENTING VIRTUAL SECURE ELEMENT

FIELD OF THE INVENTION

The present invention relates to virtualization technology, in particular, to a method for realizing virtual secure element.

BACKGROUND

Virtualization in terms of computer typically means that computing elements are on a virtual basis rather than on a real basis. The virtualization technology can expand the capacity of hardware and simplify re-configuration process of software. For example, the virtualization technology for CPU can make a single CPU simulate a plurality of CPUs in parallel so that a single platform can operate a plurality of operating systems simultaneously and that application programs can run in spaces that independent from each other without affecting each other, thus considerably improving working efficiency of computers.

In prior arts, secure element (SE) devices mainly refer to some physical hardware devices having a secure chip, such as SIM card, SD card, etc. However, existing SE devices as physical hardware devices have some deficiencies. For example, existing SE devices cannot meet one's requirements on intelligent management of mobile devices. Users can neither directly view specific information on SE devices nor conduct resource management on designated SE devices conveniently. Existing SE devices are becoming less and less adaptive to challenges of mobile devices that are becoming lighter and slimmer. In other words, the form of mobile devices will be limited by SE devices. On the other hand, existing SE devices as physical hardware devices will inevitably increase cost of mobile devices and still faces secure risk.

Therefore, there is a need for a method for realizing virtual SE using virtualized technology so as to overcome one or more of the above described deficiencies, wherein the virtual SE herein means a virtual device in an operating system which has an integral hardware performance similar to that of a real physical SE device. That is, like real physical SE devices, these virtual SEs also have components such as COS and I/O interfaces, etc.

SUMMARY OF THE INVENTION

According to an object of the invention, a method for realizing virtual secure element (VSE) is disclosed, which comprises the following steps:
a secure element manager (SEM) generates a request which comprises virtualized configuration information; and
a virtual machine monitor VMM in a hypervisor allocates an address space for the VSE according to the above request.

Preferably, before the SEM generates the request, the SEM uses a secure key to conduct a secure verification on the credibility of the current operating system.

Preferably, the virtualized configuration information comprises chip operating system (COS) of VSE, storage space capacity of VSE and personalized data of VSE, wherein the SEM configures the COS and personalized data for the VSE.

Preferably, the hypervisor records the address information allocated for the VSE.

According to an object of the invention, another method for realizing virtual secure element (VSE) is disclosed, which comprises the following steps:
a secure element manager (SEM) generates a request which comprises virtualized configuration information; and
a memory management unit (MMU) allocates an address space for the VSE according to the above request.

According to an object of the invention, another method for realizing virtual secure element (VSE) is disclosed, which comprises the following steps:
a secure element manager (SEM) generates a request which comprises virtualized configuration information;
an operating system creates threads according to the above request, and activates a virtual machine for each thread; and
the virtual machine allocates an address space for the VSE according to the virtualized configuration information.

The invention is advantageous in that a method for realizing virtual SE can be selected as actually required. The virtual SE can replace a physical SE device at a certain level, and dispenses of the cost of a physical SE device; in the meantime, the resource of a secure hardware platform can be made use of more sufficiently, and the security and operability of the virtual SE are improved. After virtualization, individual VSE devices are independent from each other, isolated securely, and do not interfere with each other. Individual VSE devices have respective integral hardware environments and operating systems, and share the storage spaces of original devices, can run respective independent application programs and complete respective system operations.

BRIEF DESCRIPTION OF THE DRAWINGS

Those skilled in the art will understand various aspects of the invention more clearly after reading the specific embodiments of the invention with reference to the accompanying drawings. It is understood by those skilled in the art that those drawings are merely used to explain the technical solutions of the invention in connection with the specific embodiments, rather than limiting the scope of protection of the invention.

DETAILED DESCRIPTION OF THE INVENTION

For the purpose of illustration, many specific details are set forth in the following description so as to provide a thorough understanding of one or more aspects of the embodiments. However, it is apparent to those skilled in the art that one or more aspects of the various embodiments can be implemented with less of these specific details. Therefore, the following description should not be considered as limiting, and the scope of protection is defined by the appended claims.

Firstly, the technical terminologies mentioned in the invention will be explained.

Secure element (SE) is an independent hardware module having computing and storing functions, in which many functions are designed for protecting the security of the stored data, and provides a corresponding secure mechanism service for use by external devices. SE is generally used to represent some hardware devices for providing a secure service, such as SIM card, SD card, etc.

Virtual secure element (VSE) is used relative to the secure element. VSE refers to a virtual SE device obtained after virtualizing a SE device; like a physical SE device, a VSE has an emulational hardware environment and chip operating system, and relevant applications can be also implemented on a VSE.

A secure element manager (SEM) is used for managing SE devices in an operating system (all the physical SE devices and VSE devices in an operating system), and meanwhile stores virtual configuration information and secure key information required for creating VSE. A SEM can be either located on an operating system of a hardware platform or be located on a cloud associated with the hardware platform.

A virtual machine monitor (VMM) is a module used for virtualization. For example, it can make a plurality of operating systems share a single one hardware processor. The VMM is contained in a Hypervisor. The Hypervisor is an intermediate software layer which is operated between physical hardware and the operating system and can be used for virtualization, and realizes isolation between the hardware layer and the operating system layer.

A memory management unit MMU is a control line for managing virtual memories and physical memories in the CPU, and meanwhile is responsible for mapping a virtual address into a physical address and providing a memory access authority of hardware mechanism.

Figure 1:
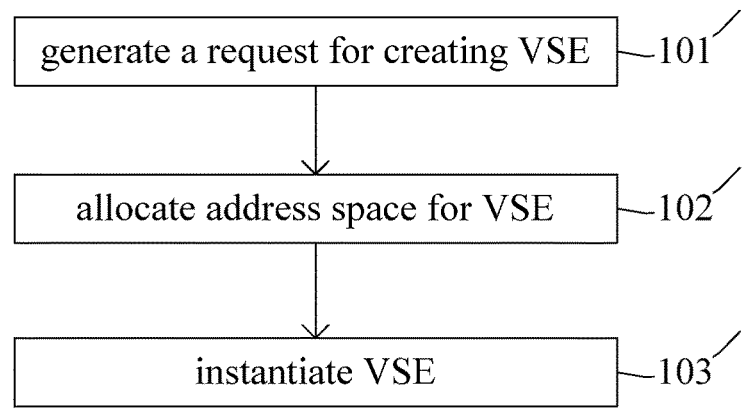
FIG. 1 is a schematic view of the method for realizing virtual SE according to an embodiment of the invention.

Specific embodiments of the invention will be further described in detail hereinafter with reference to the accompanying drawings. FIG. 1 is a schematic view of the method for realizing virtual SE according to an embodiment of the invention. As shown in FIG. 1, the method comprises substantially three steps. At step 101, a request for creating VSE is generated. At this step, the SEM generates the request which comprises virtualization configuration information. The virtualization configuration information may comprise a chip operation system of VSE, a storage space size of VSE and personalized data of VSE. At step 102, address spaces are allocated for VSEs. The individual allocated address spaces will make the individual VSEs isolate from each other and will not interfere with each other. At step 103, the VSEs are instantiated so that the VSEs have properties and functions of SEs. At this step, the SEM sets COS and personalized data for VSEs.

The three ways of allocating address spaces for VSEs according to the embodiments of the invention will be described below with reference to FIGS. 2-3.

Figure 2:
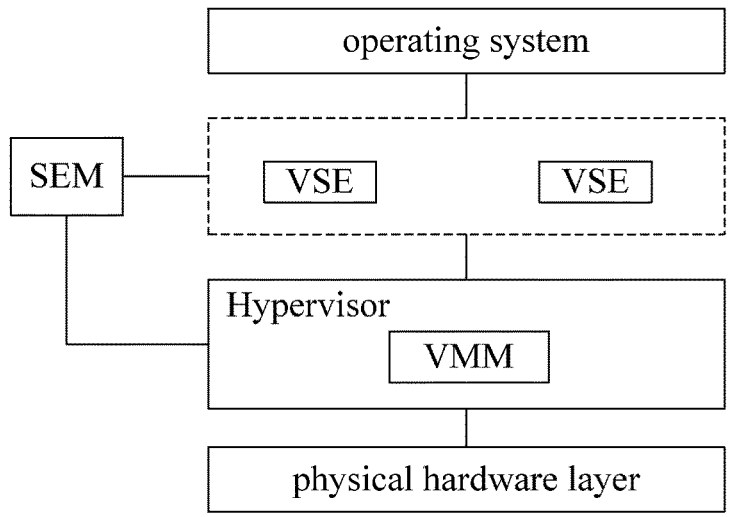
FIG. 2 is a schematic view of a system architecture for realizing virtual SE according to an embodiment of the invention.

FIG. 2 is a schematic view of a system architecture for realizing virtual SE according to an embodiment of the invention. As shown in FIG. 2, this architecture comprises a physical hardware layer, a Hypervisor layer (virtualized layer), a virtual SE layer to be realized (which may comprise one or more VSEs) and an operating system layer.

The operating system layer may comprise portions such as communication protocol, general interface and file system so as to provide various fundamental functions for the hardware platform, such as storing function, communicating function, networking function and hardware driving function, etc.

The virtual SE layer to be realized is used for storing the VSE obtained after virtualization, can operate the VSE independently, and possesses a plurality of simulated hardware units of a complete hardware environment.

The virtual SE layer can be realized through the Hypervisor. The Hypervisor operates directly on the hardware and is used for managing the distribution of hardware resource and resource sharing. Specifically, the Hypervisor can monitor and manage virtualized SE through the VMM. Each VMM that operates on the Hypervisor can be extracted through the hardware so that resource sharing can be conducted for such portions as hardware storage spaces and I/O devices or the like, and hardware device virtualization can be completed.

The SEM can be used to invoke the VMM for VSE creation, VSE information configuration and secure key verification, etc.

The physical hardware layer can for example comprise inherent hardwares and external devices such as RAM, ROM, I/O, etc.

According to the system architecture shown in FIG. 2, the method for realizing virtual SE can comprise: the SEM generating a request which comprises virtualized configuration information; and the VMM in the Hypervisor creating address spaces for the VSEs according to the above request. The above request can be sent to the Hypervisor in a form of command. According to the virtualized configuration information sent by the SEM, the VMM firstly extracts resources from the physical hardware in a reasonable manner, and isolates address spaces which meet configuration requirement. These address spaces are independent from each other, isolated safely, and do not interfere with each other. The virtual hardware obtained after virtualization correspond to the virtual SE layer shown in FIG. 2. The virtualized configuration information comprises a chip operation system of VSE, a storage space size of VSE and personalized data of VSE. After the address spaces are allocated to the VSE, the SEM sets COS and personalized data for the VSE.

Optionally, before the SEM generates the request, the SEM uses a secure key to conduct a secure verification on the credibility of the current operating system. If the verification is not passed, the SEM refuses to create VSE for the current operating system. For example, a unidirectional secure verification based on symmetric encrypted algorithm can be used. When the operating system is registered to the SEM, they will reach a consensus on shared private information (e.g., a 16 byte data). Then, when the operating system is connected to the SEM, the SEM will send request information (which can be a random data) to the operating system. The operating system, upon receipt of the request information, will use the shared private information to symmetrically encrypt it, and will return the value obtained after encryption to the SEM. Then, the SEM can make a verification and comparison on the returned encrypted value to the operating system. If they match, the verification is passed and the system is credible. Of course, the method of verifying of the invention is not limited thereto. For example, other methods of verifying (e.g., a bidirectional secure verification (based on symmetric encryption algorithm)) or other secure verifications based on asymmetric encryption algorithm that are more secure or the like can be used.

Through the above steps, the creation of VSE is smoothly accomplished using the Hypervisor layer. Meanwhile, the Hypervisor layer can also record the address allocated by each VSE and relevant information, which is more advantageous for the operating system in further operating and managing the VSE at a later time.

Figure 3:
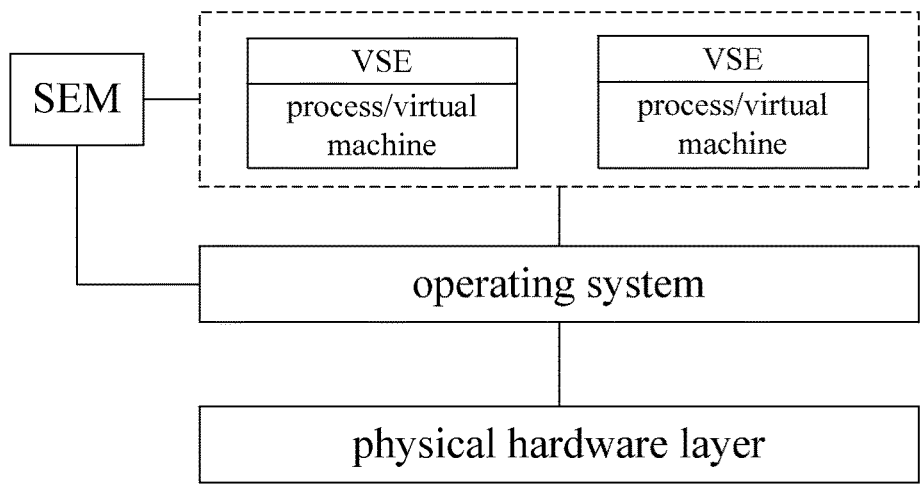
FIG. 3 is a schematic view of a system architecture for realizing virtual SE according to another embodiment of the invention.

FIG. 3 is a schematic view of a system architecture for realizing virtual SE according to another embodiment of the invention. As shown, in this embodiment, the virtual SE layer can be realized through a virtual machine or process.

The virtual SE layer is located above the operating system, and conducts resource distribution of physical hardware by invoking the operating system. Under this architecture, the creation and configuration of VSE are conducted for the allocated address spaces in the operating system according to the virtualized configuration information.

The method of realizing address space allocation of VSE through MMU and maintaining VSE through process will be described now.

In order to better perform process control, the MMU module in the CPU can be used to assist in accomplishing process simulation. The MMU allocates address spaces for VSEs according to the creating request of VSEs. The MMU module can open up an address space in the operating system as a virtual memory, and arrange all the processes into this virtual memory; then, the MMU further allocates an independent address space for each process respectively, i.e., one process corresponds to one VSE, thus ensuing that all the processes are independent from each other and do not interfere with each other.

The MMU further records the process number and address information allocated for the VSEs so that a later stage secure operating system can better conduct resource management to the VSEs.

Now, how the address spaces of VSEs are allocated through the virtual machine will be described. The virtual machine herein refers to a virtual computer which has its own dedicated instruction set, register, stack, file format, etc., and can accomplish its own stack management, garbage management, memory management, thread management independently. Under this architecture, the SEM can request the operating system via a command to create system threads, and activate a corresponding virtual machine on the thread, wherein the virtualized configuration information is additionally added into this command. As such, each thread operates one virtual machine respectively. Then, the virtual machine allocates address spaces for the VSEs according to the virtualized configuration information. After the logic partition of the VSE's storage spaces is completed, the SEM will install a designated COS in a corresponding storage space and download personalized data.

The operating system can conduct relevant resource management to each virtual machine and its running VSE respectively by designing a virtual machine manager.

The hardware platform mentioned above can be a secure hardware environment which can meet security requirements for SE devices. Such a secure hardware platform can verify external information to a maximum extent and avoid an intervention with its internal programs from external information as much as possible. Specific examples are for example a mobile device secure operating system platform based on TrustZone hardware architecture, smart card secure hardware platform, etc. The operating system mentioned above can be a secure operating system built under a secure hardware platform. Since the operating system is based on a secure hardware platform, it can ensure that the programs inside it are running normally at this time and that the communication is secure.

The invention discloses technical solutions in which SE devices are virtualized on a hardware platform and virtual SE is created without the participation of external physical SE devices. By using a virtual SE device having functions of a physical SE device, the invention is free from limitations by physical SE devices to a certain extent, thus avoiding cost involved in using physical SE devices.

The VSE realized by the invention can be configured in a secure hardware environment so that it is under a secure protection by the entire hardware environment and will not be easily attacked hostilely from outside, thus further improving the security of VSE and ensuring internal programs are running normally.

In addition, the invention can be based on a secure hardware platform for virtualization. Therefore, a KeyPad (e.g., a password keyboard in a mobile device) in a hardware layer of the secure hardware platform can be used to conduct visualized management operation of VSE. By doing so, not only the resource of secure hardware platform can be made more sufficient use of, but also the manageability and operability of virtual SE devices can be better improved.

Through the description of the above embodiments, those skilled in the art will be able to understand that various modifications and replacements can be also made to the specific embodiments of the invention without departing from the spirit and scope of the invention. These modifications and replacements will all fall within the scope defined by the appended claims of the invention.

The invention claimed is:

1. A method for realizing virtual secure element (VSE) on a system including a physical hardware layer, a hypervisor layer on top of the physical hardware layer, an operating system on top of the hypervisor layer, and a VSE layer to be realized between the hypervisor layer and the operating system, the method comprising:
   verifying, by a secure element manager (SEM) associated with the system, a credibility of the operating system requesting creation of the VSE layer using a secure key,
   in response to the verification not passed, the SEM refuses to create the one or more VSEs for the operating system;
   in response to verification passed:
      generating, by the SEM, a request which comprises virtualized configuration information, wherein the request is sent to the hypervisor layer in the form of a command for realizing one or more VSEs:
      creating, by a virtual machine monitor (VMM) in the hypervisor layer, address spaces for the one or more VSEs according to the request from the SEM, wherein the address spaces are independent from each other, isolated safely, and do not interfere with each other and
      instantiating the one or more VSEs such that the one or more VSEs have properties and functions of secure elements (SEs) and the SEM sets chip operating system (COS) and personalized data for the instantiated one or more VSE based on the virtualized configuration information.

2. The method according to claim 1, wherein:
   for each VSE of the one or more VSEs, the virtualized configuration information comprises the COS of VSE, storage space capacity of VSE and personalized data of VSE.

3. The method according to claim 2, wherein,
   the hypervisor layer records the address spaces allocated for the one or more VSEs.

* * * * *